United States Patent
Srivatsa et al.

(10) Patent No.: US 11,109,208 B2
(45) Date of Patent: *Aug. 31, 2021

(54) BLUETOOTH PROFILE FAST CONNECT

(71) Applicant: Apple Inc., Cupertino, CA (US)

(72) Inventors: Akshay Mangalam Srivatsa, Santa Clara, CA (US); Ariane Cotte, San Francisco, CA (US); Craig P. Dooley, Los Gatos, CA (US); Duy N. Phan, San Jose, CA (US); Ganesha Adkasthala Ganapathi Batta, San Jose, CA (US); Hyundoo Shin, San Jose, CA (US); Kang Sun, Sunnyvale, CA (US); Matt I. Gillette, San Ramon, CA (US); Michael Jason Giles, San Jose, CA (US); Robert D. Watson, Menlo Park, CA (US); Sean P. Wilson, Redwood City, CA (US); Sriram Hariharan, San Jose, CA (US); Sujatha Viswanathan, San Jose, CA (US); Todd Wheeler, San Jose, CA (US); Yilok L. Wong, Mountain View, CA (US); David John Shaw, Ramona, CA (US); Sarang S. Ranade, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,240

(22) Filed: Dec. 18, 2019

(65) Prior Publication Data

US 2020/0128378 A1 Apr. 23, 2020

Related U.S. Application Data

(63) Continuation of application No. 16/240,911, filed on Jan. 7, 2019, now Pat. No. 10,542,405.

(Continued)

(51) Int. Cl.
*H04W 4/80* (2018.01)
*H04W 8/00* (2009.01)
(Continued)

(52) U.S. Cl.
CPC ............. *H04W 4/80* (2018.02); *H04W 8/005* (2013.01); *H04W 76/11* (2018.02); *H04W 76/14* (2018.02)

(58) Field of Classification Search
CPC ....... H04W 4/80; H04W 76/11; H04W 76/14; H04W 84/18; H04W 8/005; H04W 8/22
See application file for complete search history.

(56) References Cited

U.S. PATENT DOCUMENTS

| 7,546,140 B2 | 6/2009 | Sinai |
| 7,756,474 B2 | 7/2010 | Watanabe |

(Continued)

*Primary Examiner* — David Bilodeau
(74) *Attorney, Agent, or Firm* — Kowert, Hood, Munyon, Rankin & Goetzel, P.C.

(57) ABSTRACT

Methods for aggregating Bluetooth profiles for faster connection and configuration are disclosed, including transmitting, subsequent to establishing a connection, a request message to a peer device that indicates support of a fast connection protocol for Bluetooth profiles configuration and receiving a response message from the peer device that indicates the peer device supports the fast connection protocol. After pairing with the peer device, a first list of profile descriptors for a plurality of Bluetooth profiles supported by the device may be transmitted to the peer device and a second list of profile descriptors for a plurality of Bluetooth profiles supported by the peer device may be received. A configuration of a plurality of Bluetooth profiles base, at least in part, on a comparison of the first list of profile descriptors to the second list of profile descriptors may be determined and transmitted to the peer device.

20 Claims, 7 Drawing Sheets

Related U.S. Application Data

(60) Provisional application No. 62/679,662, filed on Jun. 1, 2018.

(51) Int. Cl.
*H04W 76/11* (2018.01)
*H04W 76/14* (2018.01)

(56) References Cited

U.S. PATENT DOCUMENTS

| | | |
|---|---|---|
| 9,480,096 B1 | 10/2016 | Lee |
| 2005/0037708 A1 | 2/2005 | Torvinen |
| 2009/0298428 A1 | 12/2009 | Shin |
| 2009/0303926 A1* | 12/2009 | Den Hartog .......... H04L 65/103 370/328 |
| 2009/0325484 A1 | 12/2009 | Lele |
| 2014/0134951 A1* | 5/2014 | Paulson ............... H04B 5/0031 455/41.2 |
| 2015/0031288 A1 | 1/2015 | Tubbesing |
| 2015/0043427 A1 | 2/2015 | K.M. |
| 2016/0128114 A1* | 5/2016 | Moy .................... H04W 12/06 455/434 |
| 2017/0289277 A1* | 10/2017 | Lee ....................... H04W 84/18 |

* cited by examiner

BLUETOOTH PROFILE FAST CONNECT

PRIORITY DATA

This application is a continuation of U.S. patent application Ser. No. 16/240,911, filed Jan. 7, 2019, and which claims benefit of priority to U.S. Provisional Application Ser. No. 62/679,662, titled "Bluetooth Profile Fast Connect", filed Jun. 1, 2018, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD OF THE DISCLOSURE

The present application relates to wireless communication, including Bluetooth profile fast connection, e.g., by aggregating individual profile configurations for all protocol layers and exchanging/negotiating the profiles with reduced messaging between devices.

DESCRIPTION OF THE RELATED ART

Wireless communication systems are rapidly growing in usage. In recent years, wireless devices such as smart phones and tablet computers have become increasingly sophisticated. In addition, electronic devices are now expected to communicate using short range communication protocols with numerous other types of wireless devices, including user interface devices such as keyboards, mice, headsets, remote controls, etc. Additionally, different short range wireless communication technologies and standards are being used by these devices, such as IEEE 802.11 (WLAN or Wi-Fi), and BLUETOOTH™, among others.

With the growth of Bluetooth (BT) popularity, especially Bluetooth Low Energy (BTLE), consumer electronics products are being developed that will connect with multiple Bluetooth devices. For example, a computer may connect with a Bluetooth mouse/trackpad, keyboard, headset/speaker, remote controller, stylus, healthkit, homekit, smart watch, etc. Bluetooth technology may also be used to maintain connectivity with legacy Bluetooth devices.

Traditional bluetooth profile setup involves bringing up various protocol/profile layers independently. For example, in some implementations, setting up four profiles may involve the exchange of over one hundred messages and may require between two and three seconds to be completed.

SUMMARY

Embodiments are presented herein of, inter alia, improved systems and methods for Bluetooth profile fast connection, e.g., by aggregating individual profile configurations for multiple, or all, protocol layers and exchanging/negotiating the profiles with reduced, or minimal, messaging between devices.

Some embodiments may be implemented in a device that comprises at least one antenna, a first radio that implements a first radio access technology (e.g., WiFi), and a second radio that implements a second radio access technology (e.g., Bluetooth). The device may be configured to communicate with one or more other WiFi devices and one or more Bluetooth devices concurrently.

In some embodiments, a device may be configured to perform a method for aggregating Bluetooth profiles for faster connection and configuration. The method may include establishing a connection via a Bluetooth interface with a peer device and transmitting a request message to the peer device that indicates support for a fast connection protocol for Bluetooth profiles configuration. In addition, the method may include receiving a response message from the peer device that indicates the peer device supports the fast connection protocol. After pairing with the peer device, the method may further include transmitting a first list of profile descriptors for a plurality of Bluetooth profiles supported by the device to the peer device and receiving a second list of profile descriptors for a plurality of Bluetooth profiles supported by the peer device. Further, the method may include determining a configuration of a plurality of Bluetooth profiles (e.g., for the connection) based, at least in part, on a comparison of the first list of profile descriptors to the second list of profile descriptors and transmitting the configuration to the peer device.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
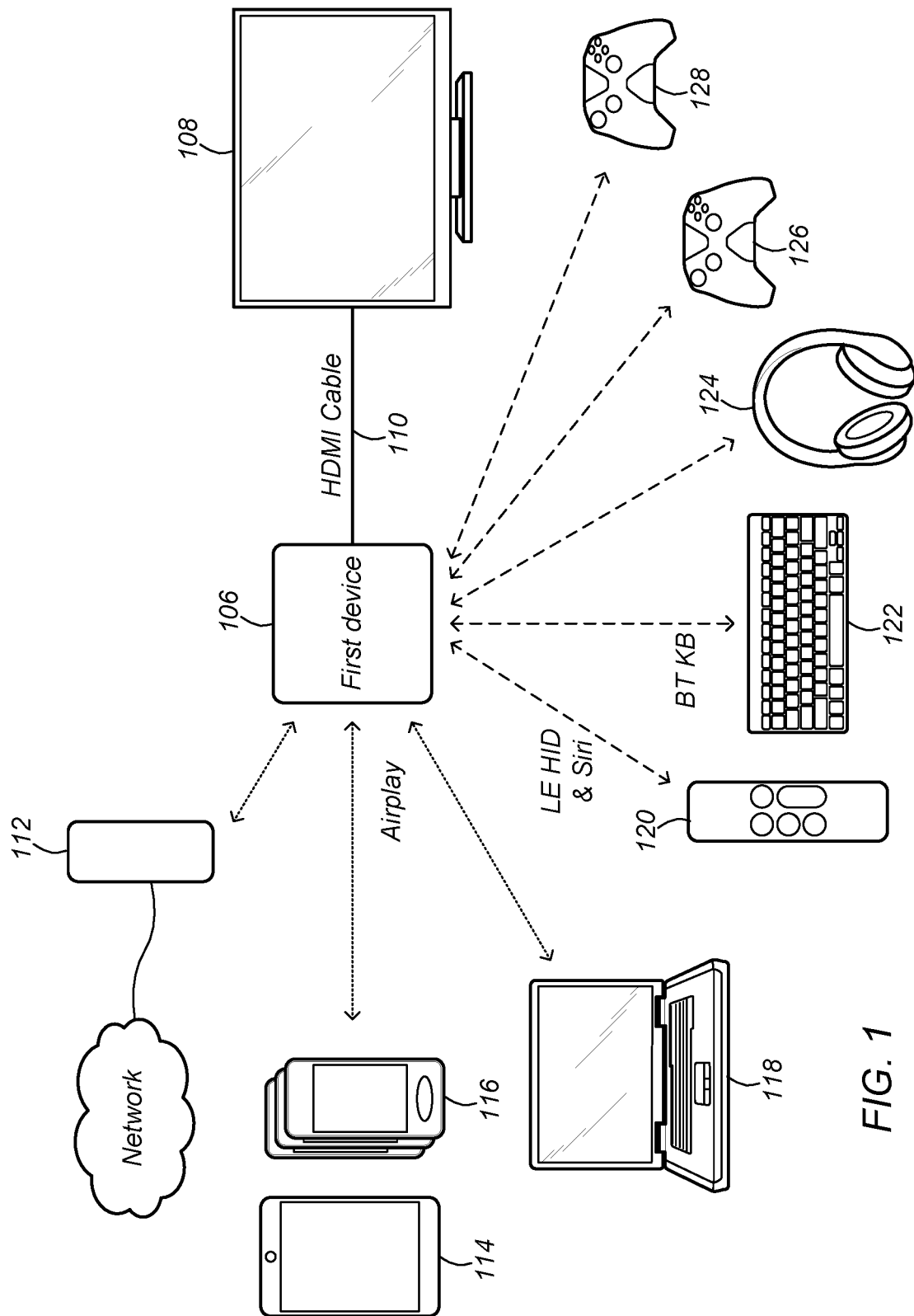
FIG. 1 illustrates an example wireless communication system where a first device connects over BT and WiFi to various other devices, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
AP: Access Point
BT: Bluetooth, including Bluetooth Low Energy and/or Bluetooth Low Energy for Audio
BTLE: Bluetooth Low Energy
BTLEA: Bluetooth Low Energy for Audio
TDD: Time Division Duplexing
TX: Transmission/Transmit
RX: Reception/Receive
LAN: Local Area Network
WLAN: Wireless LAN, also referred to as WiFi
RAT: Radio Access Technology
RSSI: Received Signal Strength Indicator
WiFi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. As used herein, the term "UE" may refer to a mobile device, as defined below. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Mobile Device (or Mobile Station)—any of various types of computer systems devices which are mobile or portable and which performs wireless communications using WLAN communication. As used herein, the term "mobile device" may refer to a UE, as defined above. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a UE, as defined above, a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Base Station (BS)—The term "Base Station" has the full breadth of its ordinary meaning, and at least includes a wireless communication station installed at a fixed location and used to communicate as part of a wireless telephone system or radio system.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

WiFi—The term "WiFi" has the full breadth of its ordinary meaning, and at least includes a wireless communication network or RAT that is serviced by wireless LAN (WLAN) access points and which provides connectivity through these access points to the Internet. Most modern WiFi networks (or WLAN networks) are based on IEEE 802.11 standards and are marketed under the name "WiFi". A WiFi (WLAN) network is different from a cellular network.

Bluetooth—The term "Bluetooth" has the full breadth of its ordinary meaning, and at least includes any of the various implementations of the Bluetooth standard, including Bluetooth Low Energy (BTLE) and Bluetooth Low Energy for Audio (BTLEA), among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—Example First Device Connecting to BT Devices

FIG. 1 shows an example first device 106, which connects over Bluetooth (BT) with various BT devices, such as remote Game Controllers (GC), a headset or speaker, keyboard, etc. The headset may be either A2DP (Advanced Audio Distribution Profile) or eSCO (extended Synchronous Connection Oriented). In addition, the first device can stream video/audio/movies/games from the Internet and connect with a computer operating system for sharing content and/or a display (e.g., using Apple Airplay or similar technology). In the example shown in FIG. 1, the first device is shown as being connected with 5 BT devices, these being the two BT game controllers, the BT headset, the BT keyboard and the BT remote control device. The first device is also shown as being connected over WiFi to a phone, a computer, and a WiFi access point. In this example embodiment, the first device is an AppleTV device, but the device may be any of various types of devices. The first device 106 may comprise a processing element, and a memory that may be comprised in or coupled to the processing element. The processing element may be configured to perform operations described herein.

In some embodiments, as further described below, the first device 106 may be configured to perform a method including establishing a connection via a Bluetooth interface with a peer device and transmitting a request message to the peer device that indicates support for a fast connection protocol for Bluetooth profiles configuration. In addition, the method may include receiving a response message from the peer device that indicates the peer device supports the fast connection protocol. After pairing with the peer device, the method may further include transmitting a first list of profile descriptors for a plurality of Bluetooth profiles supported to the peer device and receiving a second list of profile descriptors for a plurality of Bluetooth profiles supported by the peer device. Further, the method may include determining a configuration of a plurality of Bluetooth profiles (e.g., for the connection) based, at least in part, on a comparison of the first list of profile descriptors to the second list of profile descriptors and transmitting the configuration to the peer device.

Figure 2:
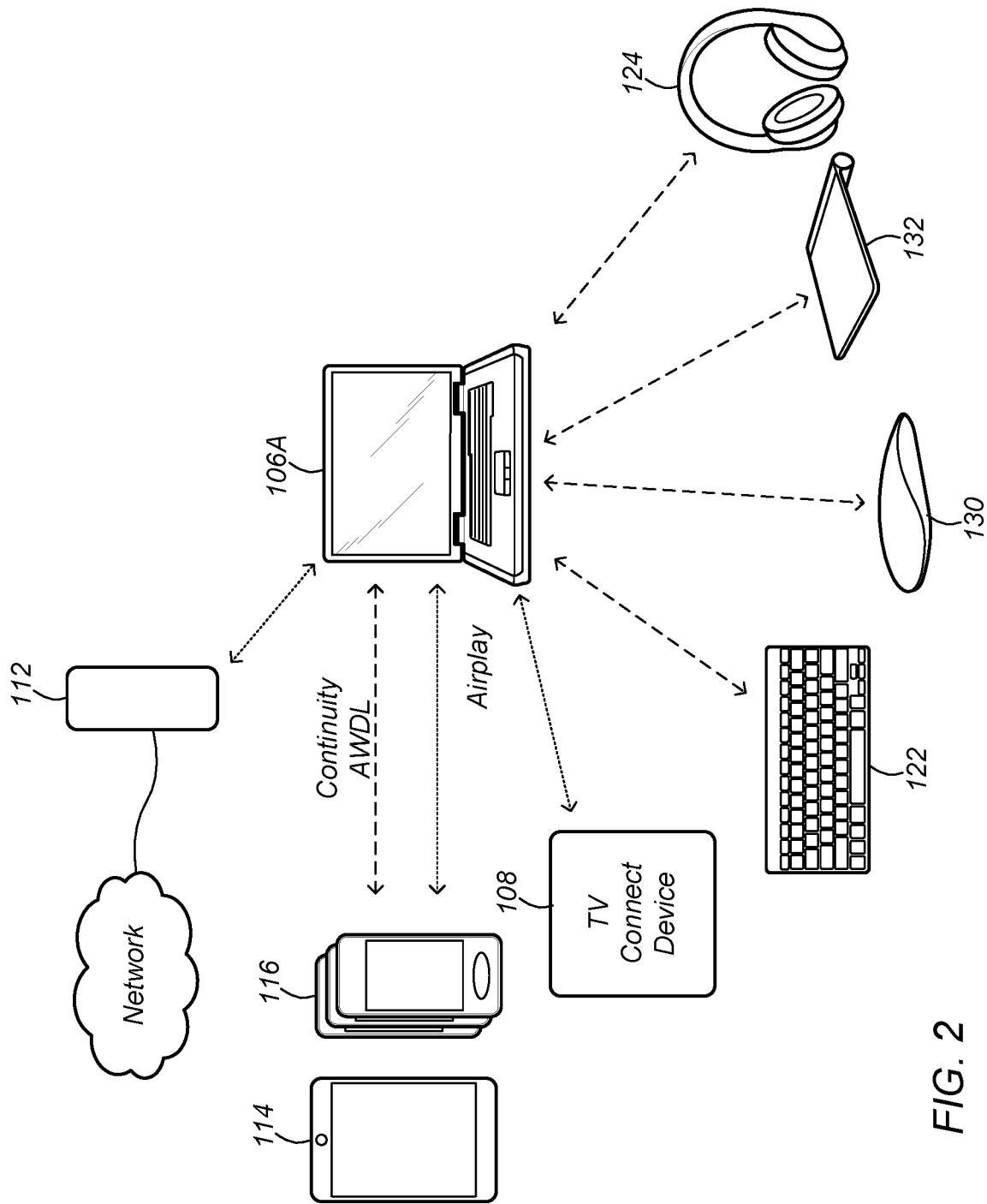
FIG. 2 illustrates an example wireless communication system where a first computer system connects over BT and WiFi to various other devices, according to some embodiments.

FIG. 2—Example First Computer System Connecting to BT Devices

FIG. 2 shows an example first computer system 106*a* connected to various devices. In this example embodiment, the first computer system is shown connected to a BT mouse, keyboard, and trackpad. The first computer system may also simultaneously or concurrently connect to headphones/speaker. In addition, the first computer system can communicate via other communication technologies, such as WiFi, to other devices, such as a smart phone and a television interconnect device. For example, where the computer is an Apple MacBook, the computer may connect to other Mac/iOS devices through Apple Wireless Direct Link (AWDL), e.g., using Airdrop, Airplay and/or Continuity. The first computer system 106*a* may comprise a processing element, and a memory that may be comprised in or coupled to the processing element. The processing element may be configured to perform operations described herein.

In some embodiments, as further described below, the first computer system 106*a* may be configured to perform a method including establishing a connection via a Bluetooth interface with a peer computer system and transmitting a request message to the peer computer system that indicates support of a fast connection protocol for Bluetooth profiles configuration. In addition, the method may include receiving a response message from the peer computer system that indicates the peer computer system supports the fast connection protocol. After pairing with the peer computer system, the method may further include transmitting a first list of profile descriptors for a plurality of Bluetooth profiles supported to the peer computer system and receiving a second list of profile descriptors for a plurality of Bluetooth profiles supported by the peer computer system. Further, the method may include determining a configuration of a plurality of Bluetooth profiles (e.g., for the connection) based, at least in part, on a comparison of the first list of profile descriptors to the second list of profile descriptors and transmitting the configuration to the peer computer system.

Figure 3:
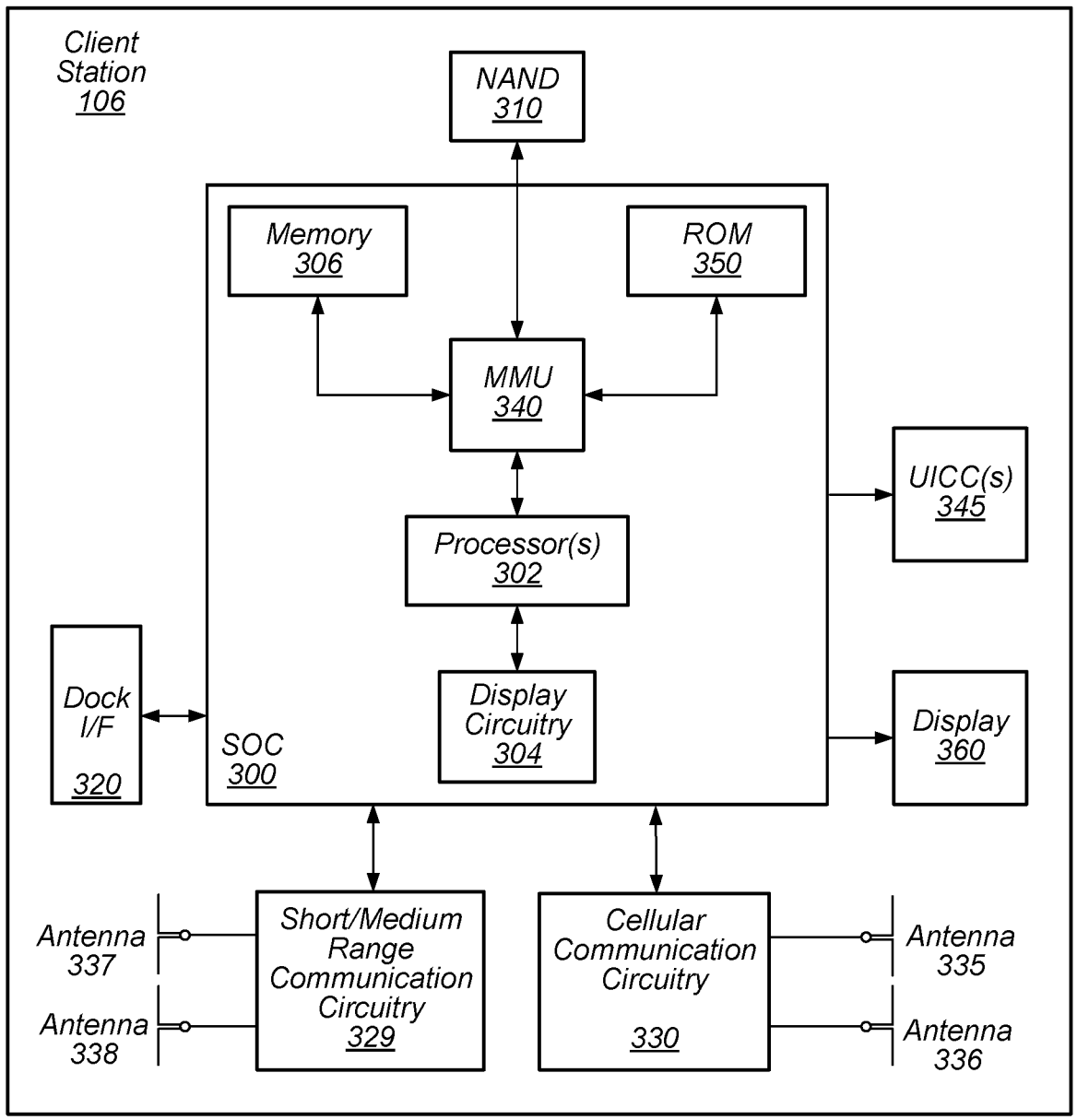
FIG. 3 illustrates an exemplary block diagram of a device, according to some embodiments.

FIG. 3—Example Block Diagram of a Device

FIG. 3 illustrates an exemplary block diagram of a device 106, such as the first device in FIG. 1 or 2. It is noted that the block diagram of the device 106 of FIG. 3 is only one example of a possible device. In some embodiments, the device 106 may be a computer system, a client station, a wireless station, a wireless device, and/or a UE. As shown, the device 106 may include a system on chip (SOC) 300, which may include portions for various purposes. The SOC 300 may be coupled to various other circuits of the device 106. For example, the device 106 may include various types of memory (e.g., including NAND flash 310), a connector interface (I/F) (or dock) 320 (e.g., for coupling to a computer system, dock, charging station, etc.), the display 360, cellular communication circuitry 330 such as for 5G-NR, LTE-A, LTE, GSM, etc., and short to medium range wireless communication circuitry 329 (e.g., Bluetooth™ and WLAN circuitry). The device 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the device 106 may be configured to communicate wirelessly directly with one or more neighboring client stations. The device 106 may be configured to communicate according to a WLAN RAT for communication in a WLAN network, such as that shown in FIG. 1. Further, in some embodiments, as further described below, device 106 may be configured to perform a method including establishing a connection via a Bluetooth interface with a peer device and transmitting a request message to the peer device that indicates support of a fast connection protocol for Bluetooth profiles configuration. In addition, the method may include receiving a response message from the peer device that indicates the peer device supports the fast connection protocol. After pairing with the peer device, the method may further include transmitting to the peer device a first list of profile descriptors for a plurality of Bluetooth profiles supported and receiving a second list of profile descriptors for a plurality of Bluetooth profiles supported by the peer device. Further, the method may include determining a configuration of a plurality of Bluetooth profiles (e.g., for the connection) based, at least in part, on a comparison of the first list of profile descriptors to the second list of profile descriptors and transmitting the configuration to the peer device.

As described herein, the device 106 may include hardware and/or software components for implementing the features described herein. For example, the processor 302 of the device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Bluetooth Fast Connection

As noted above, in current implementations, Bluetooth profile setup may involve bringing up various profile/protocol layers independently. For example, to connect (e.g., after pairing) a wireless head set to a wireless station, over 100 hundred messages may be exchanged between the wireless head set (e.g., a Bluetooth sink—a device consuming/seeking a service) and the wireless station (e.g., a Bluetooth source—a device providing/advertising a service) to setup the profiles (e.g., five profiles) necessary for the connection. The profiles may be set up in serial, e.g., a profile for headphones may be set up followed by a profile for telephone, and a profile for media. The exchange may take seconds, e.g., up to 12 seconds, to complete, in some scenarios.

Embodiments described herein provide mechanisms to reduce profile setup time (e.g., connection) to less than 1 second. In some embodiments, the mechanisms may include aggregating individual profile configurations for multiple or all protocol layers together, thereby reducing messages exchanged between devices, e.g., to less than 10. In some embodiments, fast connection may only occur after devices have been paired. In some embodiments, each device may indicate fast connection capability. In some embodiments, a fast connection protocol (or mechanism) may include (1) discovery, (2) negotiation, (3) setup, and (4) connection.

Figure 4:
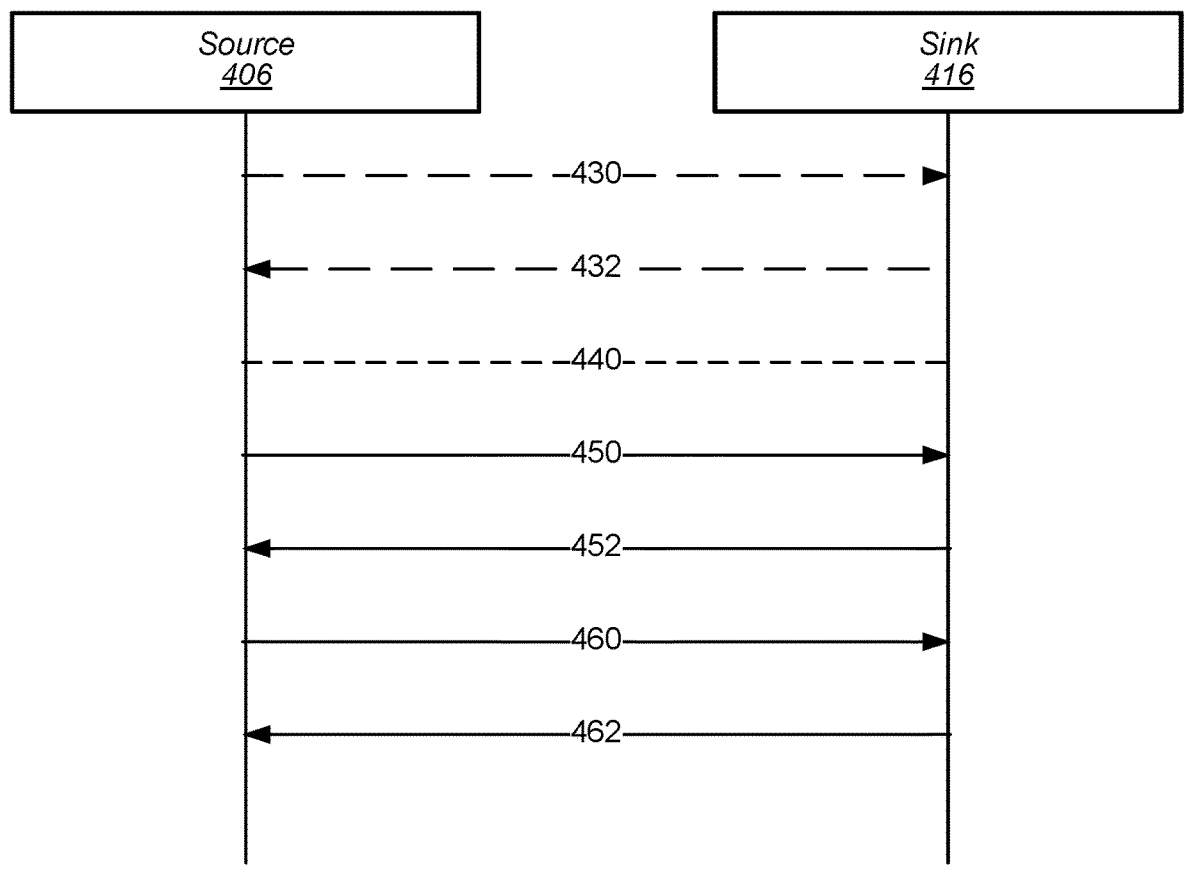
FIG. 4 illustrates a block diagram of an example of signaling for fast connection of devices via Bluetooth, according to some embodiments.

FIG. 4 illustrates a block diagram of an example of signaling for fast connection of devices via Bluetooth, according to some embodiments. The signaling shown in FIG. 4 may be used in conjunction with any of the systems or devices shown in the above Figures, among other devices. In various embodiments, some of the signaling shown may be performed concurrently, in a different order than shown, or may be omitted. Additional signaling may also be performed as desired. As shown, this signaling sequence may operate as follows.

In some embodiments, discovery for the fast connection protocol may include signals 430 and 432 between source device 406 and sink device 416. In some embodiments, source device 406 and sink device 416 may each be a client station, such as device 106 described above. In some embodiments, fast connection discovery may include establishing (initiating) a connection based on Asynchronous Connection-Less (ACL) protocol. In other words, an ACL connection may be established. In addition, a device (e.g., source device 406) may check (or otherwise determine) whether the device is paired to a peer device (e.g., sink device 416) and further, whether the peer device supports fast connection protocol (e.g., Profile Fast Connect or PFC).

In some embodiments, upon determining the fast connection protocol is supported, the source device 406 may transmit (send) a fast connect discovery message 430 over a Logical and Link Controls Adaptation Protocol (L2CAP) echo request. In some embodiments, the fast connect discovery message 430 may include an indication that the source device 406 supports the fast connection protocol. In some embodiments, the fast connect discovery message 430 may be un-encrypted. In some other embodiments, the fast connect discovery message 430 may be encrypted. In some embodiments, the fast connect discovery request message 430 may be an echo request message. In some embodiments, the fast connect discovery message 430 may include any, any combination of, and/or all of a local channel identification (ID) and maximum transmission unit (MTU) for a fast connect L2CAP channel, a version of the fast connection protocol, a transaction identifier (TID) (e.g., identifying if a message is new or a re-transmission), supported features, supported profile mask (e.g., a 64 bit mask of all fast connect profiles supported by source device 406), and/or a minimum supported version of the fast connection protocol (e.g., PFC version).

In some embodiments, if sink device 416 supports the fast connection protocol, sink device 416 may transmit (send) a discovery response message 432. The discovery response message 432 may include an indication that the sink device 416 supports the fast connection protocol. In some embodiments, the discovery response message 432 may be un-encrypted. In some other embodiments, the discovery response message 432 may be encrypted. In some embodiments, the discovery response message 432 may be an echo request message. In some embodiments, the discovery response message 432 may include any, any combination of, and/or all of a local channel identification (ID) and maximum transmission unit (MTU) for a fast connect L2CAP channel, a version of the fast connection protocol, transaction identifier (TID) (e.g., identifying if a message is new or a re-transmission), supported features, supported profile mask (e.g., a 64 bit mask of all fast connect profiles supported by sink device 416), and/or a minimum supported version of the fast connection protocol (e.g., PFC version).

In some embodiments, an out of band (OOB) L2CAP channel may be established based on (or using) the channel ID and/or MTUs exchanged over echo request/echo response. In some embodiments, the OOB L2CAP channel may be considered (or used as) the fast connection channel. In some embodiments, the fast connection channel may be a logical channel. Thus, if both devices support the fast connection protocol, negotiation of the logical channel may be skipped. In other words, if both devices support the fast connection protocol, the logical channel may be determined based on the exchanged channel IDs and/or MTUs without negotiation. In addition, at 440, the devices may be paired (e.g., via secure simple pairing (SSP) or Magic pairing derived key depending on how the devices paired) and the link by be authenticated, thereby encrypting the link.

In some embodiments, negotiation for the fast connection protocol may include signals 450 and 452, transmitted on the fast connection channel, between source device 406 and sink device 416. In some embodiments, source device 406 may transmit (send) message 450 that may include profile descriptors of profiles supported by source device 406 over the fast connection channel. The profile descriptors may be an aggregate of multiple profiles to be negotiated. In other words, instead of sending individual messages to setup a particular profile (e.g., setting up multiple profiles in series or sequence), the source device 406 may send a single message that may combine multiple profiles such that the multiple profiles may be set up in parallel. In some embodiments, the message 450 may include all data related to profiles supported by source device 406. Upon receiving message 450, sink device 416 may store the profile descriptors of source device 406. In addition, sink device 416 may transmit (send) message 452 that may include profile descriptors of profiles supported by sink device 416 over the fast connection channel. The profile descriptors may be an aggregate of multiple profiles to be negotiated. In other words, instead of sending individual messages to setup a particular profile (e.g., setting up multiple profiles in series or sequence), the sink device 416 may send a single message that may combine multiple profiles such that the multiple profiles may be set up in parallel. In some embodiments, the message 452 may include all data related to profiles supported by sink device 416.

As described above, in some embodiments, the profile descriptors, e.g., fast connect descriptors, may aggregate configuration parameters for all supported profiles. In some embodiments, a profile descriptor may include any, any combination of, and/or all of L2CAP channel information for each channel, radio frequency communication (RF-COMM) channel information if a profile is over RFCOMM, handsfree service level connection data, audio/video data transport protocol/advanced audio distribution profile (AVDTP/A2DP) profile information, audio/video control transport protocol/audio/video remote control profile (AVCTP/AVRCP) profile information, and/or advanced accessory control profile (AACP) profile information. In some embodiments, the L2CAP channel information for each channel may include channel ID, protocol and service multiplexers (PSMs), MTU, and/or retransmission mode parameters. In some embodiments, the RFCOMM channel information may include server channel, maximum frame size, flow control model, initial credits, and/or initiator parameters. In some embodiments, the handsfree service level connection data may include version, supported codecs, local features, call indicators, call hold, volume gain, microphone gain, echo cancellation, and/or vendor specific features parameters. In some embodiments, the AVDTP/A2DP profile information may include AVDTP version, A2DP version, endpoint list, configuration data per endpoint, signal channel L2CAP information, media channel L2CAP information, and/or delay report parameters. In some embodiments, the AVCTP/AVRCP profile information may include a version parameter. In some embodiments, the AACP profile information may include advanced accessory profile (AAP) service identifier, version, opcode, and/or features parameters.

In some embodiments, a profile descriptor (e.g., a fast connect descriptor) may follow a type, length, value (TLV) like type-value format. In other words, a profile descriptor may be encoded using TLVs. Such a format may allow individual values to be added and/or removed from the profile descriptor without impacting parsing of the profile descriptor.

In some embodiments, setup of the fast connection protocol may include signals 460 and 462, transmitted on the fast connection channel, between source device 406 and sink device 416. In some embodiments, once negotiation is complete (e.g., once messages 450 and 452 have been exchanged), source device 406 may determine a configuration to be used, e.g., based on the data exchanged during negotiation. Thus, source device 406 may compare the data related to profiles supported by sink device 416 to data related to profiles supported by source device 406. Based on the comparison, source device 406 may use multiple or all of the matching profiles for the configuration. In other words, multiple or all of the profiles that are supported by both source device 406 and sink device 416 may be included in the configuration. Once the configuration has been determined by source device 406, source device 406 may transmit (send) message 460 to sink device 416. Message 460 may be a fast connect configure message and may include data required to configure the determined (negotiated) profiles. Upon receiving message 460, sink device 416 may apply the configuration included in message 460. After application of the configuration, sink device 416 may transmit (send) message 462 to source device 406. Message 462 may be a fast connect setup complete message and may include configuration status for each profile included in the configuration determined by source device 406.

Once setup is complete, the fast connection channel may be terminated (e.g., disconnected). The connection phase of the fast connect protocol may conclude with either device initiating profile operations such as music streaming and/or voice call routing, among other profile operations. In addition, profile disconnection and/or any other profile operation may proceed according to prior implementations.

Figure 5:
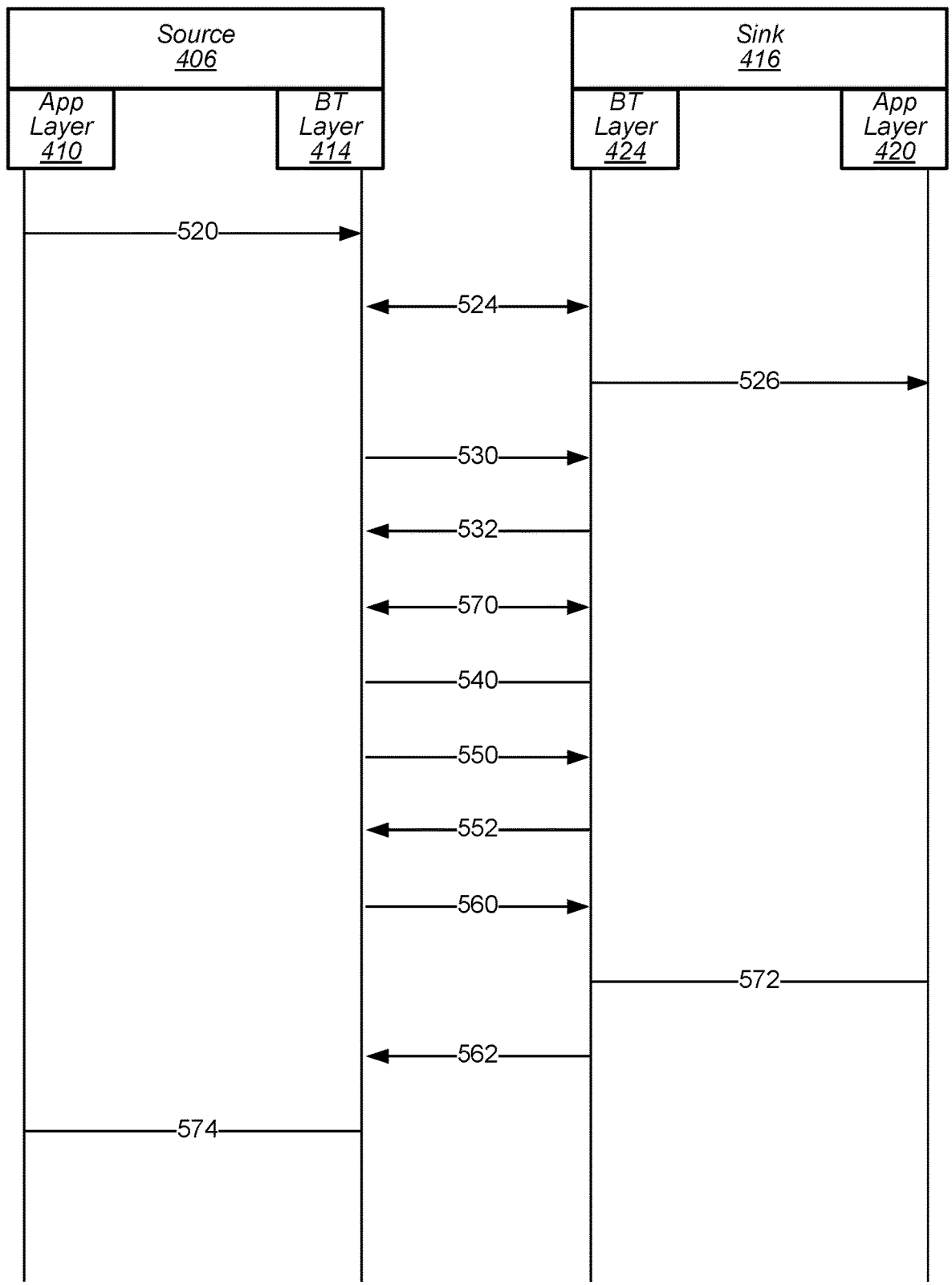
FIG. 5 illustrates an example of a connection sequence initiated by the source device (e.g., a device providing/advertising a service), according to some embodiments.
Figure 6:
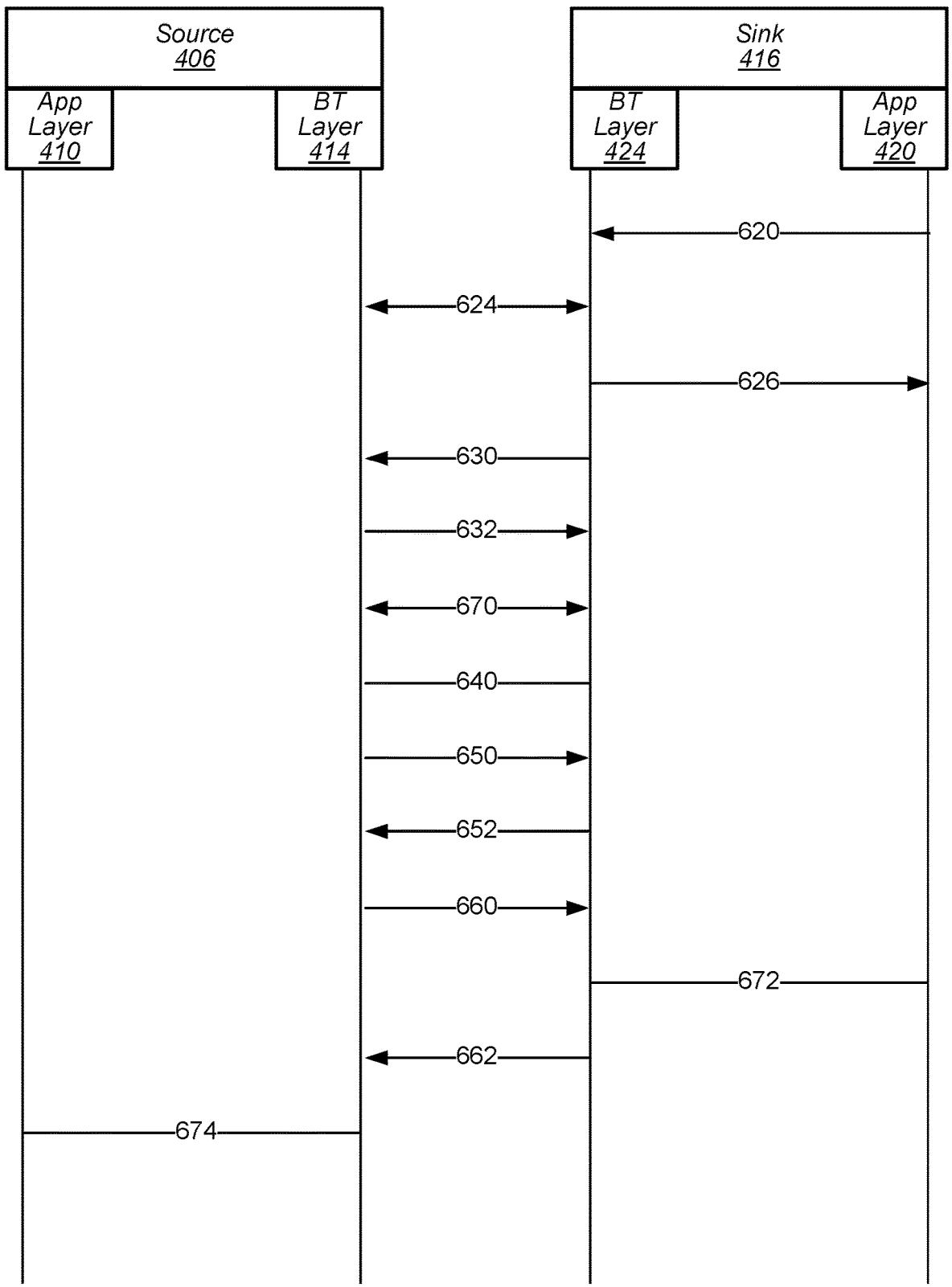
FIG. 6 illustrates an example of a connection sequence initiated by the sink device (e.g., a device consuming/seeking a service), according to some embodiments.

FIGS. 5 and 6 illustrate further examples of connection sequences between a source device (e.g., device 406) and a sink device (e.g., device 416), according to some embodiments. In particular, FIG. 5 illustrates an example of a connection sequence initiated by the source device, according to some embodiments, and FIG. 6 illustrates an example of a connection sequence initiated by the sink device, according to some embodiments. As shown in FIGS. 5 and 6, source device 406 may include an application layer 410 and a Bluetooth layer 414. Similarly, sink device 416 may include an application layer 420 and a Bluetooth layer 424. Note that the signaling shown in FIGS. 5 and 6 may be used in conjunction with any of the systems or devices shown in the above Figures, among other devices. In various embodiments, some of the signaling shown may be performed concurrently, in a different order than shown, or may be omitted. Additional signaling may also be performed as desired.

Turning to FIG. 5, application layer 410 may initiate the signaling sequence by transmitting (sending) a connection request message 520 to Bluetooth (BT) layer 414 of source device 406. BT layer 414 may discover BT layer 424 of sink device 416 and a baseband connection between the devices may be established via message exchange 524. Responsive to the message exchange 524, BT layer 424 may transmit an early connection indication message 526 to application layer 420 of sink device 416. At this point, the devices may be considered connected.

In some embodiments, upon determining fast connection protocol is supported, the BT layer 414 may transmit (send), to BT layer 424, a fast connect discovery message 530 over a L2CAP echo request. In some embodiments, the fast connect discovery message 530 may include an indication that the source device 406 supports the fast connection protocol. In some embodiments, the fast connect discovery message 530 may be un-encrypted. In some embodiments, the discovery request message 530 may be an echo request message. In some embodiments, the fast connect discovery message 530 may include any, any combination of, and/or all of a local channel identification (ID) and maximum transmission unit (MTU) for a fast connect L2CAP channel, a version of the fast connection protocol, transaction identifier (TID) (e.g., identifying if a message is new or a re-transmission), supported features, supported profile mask (e.g., a 64 bit mask of all fast connect profiles supported by source device 406), and/or a minimum supported version of the fast connection protocol (e.g., PFC version).

In some embodiments, if sink device 416 supports the fast connection protocol, BT layer 424 may transmit (send), to BT layer 414, a discovery response message 532. The discovery response message 532 may include an indication that the sink device 416 supports the fast connection protocol. In some embodiments, the discovery response message 532 may be un-encrypted. In some other embodiments, the discovery response message 532 may be encrypted. In some embodiments, the discovery response message 532 may be an echo request message. In some embodiments, the discovery response message 532 may include any, any combination of, and/or all of a local channel identification (ID) and maximum transmission unit (MTU) for a fast connect L2CAP channel, a version of the fast connection protocol, transaction identifier (TID) (e.g., identifying if a message is new or a re-transmission), supported features, supported profile mask (e.g., a 64 bit mask of all fast connect profiles supported by sink device 416), and/or a minimum supported version of the fast connection protocol (e.g., PFC version).

In some embodiments, an out of band (OOB) L2CAP channel may be established based on (or using) the channel ID and MTUs exchanged over echo request/echo response. In some embodiments, the OOB L2CAP channel may be considered (or used as) the fast connection channel. In some embodiments, the fast connection channel may be a logical channel. Thus, if both devices support the fast connection protocol, negotiation of the logical channel may be skipped. In other words, if both devices support the fast connection protocol, the logical channel may be determined based on the exchanged channel IDs and MTUs without negotiation. In addition, at 570, the devices may be paired (e.g., via secure simple pairing (SSP) or Magic pairing derived key depending on how the devices paired), and at 540, the link may be authenticated thereby encrypting the link.

In some embodiments, negotiation for the fast connection protocol may include signals 550 and 552, transmitted on the fast connection channel, between BT layer 414 and BT layer 424. In some embodiments, BT layer 414 may transmit (send) message 550 that may include profile descriptors of profiles supported by source device 406 over the fast connection channel to BT layer 424. The profile descriptors may be an aggregate of multiple profiles to be negotiated. In other words, instead of sending individual messages to setup a particular profile (e.g., setting up multiple profiles in series or sequence), the BT layer 414 may send a single message that may combine multiple profiles such that the multiple profiles may be set up in parallel. In some embodiments, the message 550 may include all data related to profiles supported by source device 406. Upon receiving message 450, BT layer 424 may store the profile descriptors of source device 406. In addition, BT layer 424 may transmit (send) message 552 that may include profile descriptors of profiles supported by sink device 416 over the fast connection channel. The profile descriptors may be an aggregate of multiple profiles to be negotiated, e.g., as described above.

In some embodiments, setup of the fast connection protocol may include signals 560 and 562, transmitted on the fast connection channel, between BT layers 414 and 424. In some embodiments, once negotiation is complete (e.g., once messages 550 and 552 have been exchanged), source device 406 may determine a configuration to be used, e.g., based on the data exchanged during negotiation. Thus, as described above, source device 406 may compare the data related to profiles supported by sink device 416 to data related to profiles supported by source device 406. Based on the comparison, source device 406 may use all matching profiles for the configuration. In other words, all profiles that are supported by both source device 406 and sink device 416 may be included in the configuration. Once the configuration has been determined by source device 406, BT layer 414 may transmit (send) message 560 to BT layer 424. Message 560 may be a fast connect configure message and may include data required to configure the determined (negotiated) profiles. At 572, upon receiving message 560, BT layer 424 may apply the configuration included in message 560. After application of the configuration at 572, BT layer 424 may transmit (send) message 562 to BT layer 414. Message 562 may be a fast connect setup complete message and may include configuration status for each profile included in the configuration determined by source device 406. At 574, upon receiving message 562, BT layer 414 may apply the configuration included in message 560.

Turning to FIG. 6, application layer 420 may initiate the signaling sequence by transmitting (sending) a connection request message 620 to Bluetooth (BT) layer 424 of sink device 416. BT layer 424 may discover BT layer 414 of source device 406 and a baseband connection between the devices may be established via message exchange 624. Responsive to the message exchange 624, BT layer 424 may transmit an early connection indication message 626 to application layer 420 of sink device 416. At this point, the devices may be considered connected.

In some embodiments, upon determining that a fast connection protocol is supported, the BT layer 414 may transmit (send), to BT layer 424, a fast connect discovery message 630 over a L2CAP echo request. In some embodiments, the fast connect discovery message 630 may include an indication that the source device 406 supports the fast connection protocol. In some embodiments, the fast connect discovery message 630 may be un-encrypted. In some other embodiments, the fast connect discovery message 630 may be encrypted. In some embodiments, the discovery request message 630 may be an echo request message. In some embodiments, the fast connect discovery message 630 may include any, any combination of, and/or all of a local channel identification (ID) and maximum transmission unit (MTU) for a fast connect L2CAP channel, a version of the fast connection protocol, transaction identifier (TID) (e.g., identifying if a message is new or a re-transmission), supported features, supported profile mask (e.g., a 64 bit mask of all fast connect profiles supported by source device 406), and/or a minimum supported version of the fast connection protocol (e.g., PFC version).

In some embodiments, if sink device 416 supports the fast connection protocol, BT layer 424 may transmit (send), to BT layer 414, a discovery response message 632. The discovery response message 632 may include an indication that the sink device 416 supports the fast connection protocol. In some embodiments, the discovery response message 632 may be un-encrypted. In some other embodiments, the discovery response message 632 may be encrypted. In some embodiments, the discovery response message 632 may be an echo request message. In some embodiments, the discovery response message 632 may include any, any combination of, and/or all of a local channel identification (ID) and maximum transmission unit (MTU) for a fast connect L2CAP channel, a version of the fast connection protocol, transaction identifier (TID) (e.g., identifying if a message is new or a re-transmission), supported features, supported profile mask (e.g., a 64 bit mask of all fast connect profiles supported by sink device 416), and/or a minimum supported version of the fast connection protocol (e.g., PFC version).

In some embodiments, an out of band (OOB) L2CAP channel may be established based on (or using) the channel ID and MTUs exchanged over echo request/echo response. In some embodiments, the OOB L2CAP channel may be considered (or used as) the fast connection channel. In some embodiments, the fast connection channel may be a logical channel. Thus, if both devices support the fast connection protocol, negotiation of the logical channel may be skipped. In other words, if both devices support the fast connection protocol, the logical channel may be determined based on the exchanged channel IDs and MTUs without negotiation. In addition, at 670, the devices may be paired (e.g., via secure simple pairing (SSP) or Magic pairing derived key depending on how the devices paired), and at 640, the link may be authenticated thereby encrypting the link.

In some embodiments, negotiation for the fast connection protocol may include signals 650 and 652, transmitted on the fast connection channel, between BT layer 414 and BT layer 424. In some embodiments, BT layer 414 may transmit (send) message 650 that may include profile descriptors of profiles supported by source device 406 over the fast connection channel to BT layer 424. The profile descriptors may be an aggregate of multiple profiles to be negotiated. In other words, instead of sending individual messages to setup a particular profile (e.g., setting up multiple profiles in series or sequence), the BT layer 414 may send a single message that may combine multiple profiles such that the multiple profiles may be set up in parallel. In some embodiments, the message 650 may include all data related to profiles supported by source device 406. Upon receiving message 450, BT layer 424 may store the profile descriptors of source device 406. In addition, BT layer 424 may transmit (send) message 652 that may include profile descriptors of profiles supported by sink device 416 over the fast connection channel. The profile descriptors may be an aggregate of multiple profiles to be negotiated, e.g., as described above.

In some embodiments, setup of the fast connection protocol may include signals 660 and 662, transmitted on the fast connection channel, between BT layers 414 and 424. In some embodiments, once negotiation is complete (e.g., once messages 650 and 652 have been exchanged), source device 406 may determine a configuration to be used, e.g., based on the data exchanged during negotiation. Thus, as described above, source device 406 may compare the data related to profiles supported by sink device 416 to data related to profiles supported by source device 406. Based on the comparison, source device 406 may use multiple or all matching profiles for the configuration. In other words, multiple or all of the profiles that are supported by both source device 406 and sink device 416 may be included in the configuration. Once the configuration has been determined by source device 406, BT layer 414 may transmit (send) message 660 to BT layer 424. Message 660 may be a fast connect configure message and may include data required to configure the determined (negotiated) profiles. At 672, upon receiving message 660, BT layer 424 may apply the configuration included in message 660. After application of the configuration at 672, BT layer 424 may transmit (send) message 662 to BT layer 414. Message 662 may be a fast connect setup complete message and may include configuration status for each profile included in the configuration determined by source device 406. At 674, upon receiving message 662, BT layer 414 may apply the configuration included in message 660.

Figure 7:
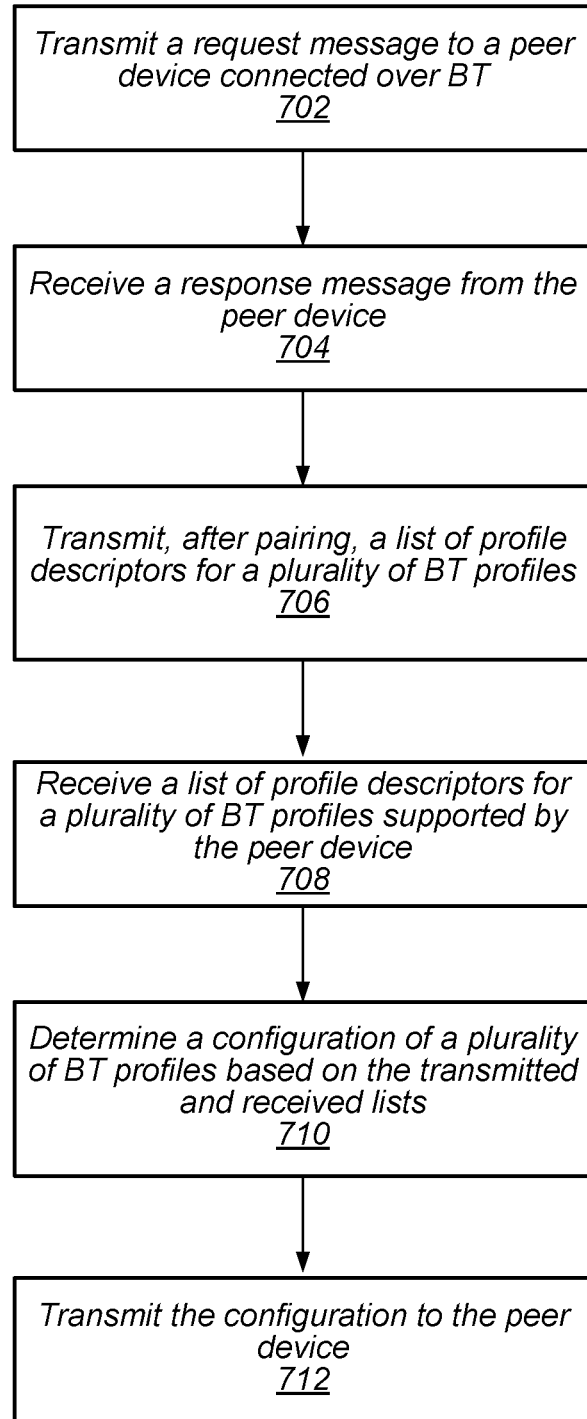
FIG. 7 illustrates a block diagram of an example of a method for connecting Bluetooth devices, according to some embodiments.

FIG. 7 illustrates a block diagram of an example of a method for connecting Bluetooth devices, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a request message may be transmitted to a peer device that may be connected via Bluetooth and/or Bluetooth LE. In some embodiments, the connection may be over (or via) a Bluetooth interface. In some embodiments, the request message may indicate support for a fast connection protocol for Bluetooth profiles configuration. In some embodiments, the request message may include a first indication of a channel for communication of profile descriptors for a plurality of Bluetooth profiles. In some embodiments, the request message may indicate support of substantially parallel setup of a plurality of Bluetooth profiles. In some embodiments, the request message may include any, any combination of, and/or all of a local channel identification, a maximum transmission unit (MTU) for a link control adaptation protocol (L2CAP) channel, a version of the fast connection protocol, a transaction identifier, and/or a minimum supported version of the fast connection protocol. In some embodiments, the request message may include (and/or further include) a supported profile mask of all fast connect protocol profiles supported by the device. In some embodiments, the request message may include one or more parameters indicating a version of the fast connection protocol and/or a minimum supported version of the fast connection protocol.

At 704, a response message may be received from the peer device. In some embodiments, the response message may indicate support for the fast connection protocol. In some embodiments, the response message may include a second indication of a channel for communication of profile descriptors for a plurality of Bluetooth profiles. In some embodiments, the response message may indicate support for substantially parallel setup of a plurality of Bluetooth profiles. In some embodiments, the response message may include any, any combination of, and/or all of a local channel identification, a maximum transmission unit (MTU) for a link control adaptation protocol (L2CAP) channel, a version of the fast connection protocol, a transaction identifier, and/or a minimum supported version of the fast connection protocol. In some embodiments, the response message may include (and/or further include) a supported profile mask of all fast connect protocol profiles supported by the peer device. In some embodiments, the response message may include one or more parameters indicating a version of the fast connection protocol and/or a minimum supported version of the fast connection protocol.

At 706, a list of profile descriptors (e.g., Bluetooth profile descriptors) for a plurality of Bluetooth profiles that are supported may be transmitted to the peer device. In some embodiments, the list of profile descriptors may only be transmitted after pairing of the devices. In some embodiments, the list of profile descriptors may be transmitted on a channel different from a channel used for the request and response messages. In some embodiments, the channel may be determined, based at least in part, on information included and/or indicated by the request and/or response messages. In some embodiments, the list of profile descriptors may aggregate configuration parameters for the plurality of Bluetooth profiles supported. In some embodiments, a Bluetooth profile may include any, any combination of, and/or all of link control adaptation protocol (L2CAP) channel information, radio frequency communication (RF-COMM) channel information if a profile is over RFCOMM, handsfree service level connection data, audio/video data transport protocol/advanced audio distribution profile (AVDTP/A2DP) profile information, audio/video control transport protocol/audio/video remote control profile (AVCTP/AVRCP) profile information, and/or advanced accessory control profile (AACP) profile information. In some embodiments, a Bluetooth profile descriptor may be encoded using a type, length, value (TLV) type format.

At 708, a list of profile descriptors (e.g., Bluetooth profile descriptors) for a plurality of Bluetooth profiles supported by the peer device may be received from the peer device. In some embodiments, the list of profile descriptors may be received on a channel different from a channel used for the request and response messages. In some embodiments, the list of profile descriptors may aggregate configuration parameters for the plurality of Bluetooth profiles supported by the peer device.

At 710, a configuration of a plurality of Bluetooth profiles may be determined based, at least in part, on the lists of profile descriptors. In some embodiments, the lists of profile descriptors may be compared, e.g., to determine profile matches between the lists. Thus, in some embodiments, the configuration of the plurality of Bluetooth profiles may include Bluetooth profiles matched between the transmitted list of Bluetooth profile descriptors and the received list of Bluetooth profile descriptors.

At 712, the configuration of the plurality of Bluetooth profiles may be transmitted to the peer device. In some embodiments, the configuration may be transmitted via a channel different from the channel used for the request and response messages. In some embodiments, the configuration may be transmitted on a channel used for transmission and reception of the lists of profile descriptors.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform communications via a Bluetooth interface; and
   at least one processor in communication with the at least one radio;
   wherein the at least one processor is configured to cause the wireless station to:
      transmit, over a first channel after establishment of a Bluetooth connection with a peer wireless station, a request message to the peer wireless station, wherein the request message indicates support of a fast connection protocol for Bluetooth profiles configuration;
      receive, over the first channel, a response message from the peer wireless station, wherein the response message indicates support of the fast connection protocol; and
      pair with the peer wireless station.

2. The wireless station of claim 1,
   wherein the at least one processor is further configured to cause the wireless station to:
      transmit, over a second channel, a first set of Bluetooth profile descriptors to the peer wireless station;
      receive, over the second channel, a second set of Bluetooth profile descriptors from the peer wireless station;
      determine a configuration of a plurality of Bluetooth profiles based, at least in part, on a comparison of the first set of Bluetooth profile descriptors to the second set of Bluetooth profile descriptors; and transmit, over the second channel, the configuration to the peer wireless station.

3. The wireless station of claim 2, wherein the configuration of the plurality of Bluetooth profiles comprises Bluetooth profiles matched between the first set of Bluetooth profile descriptors and the second set of Bluetooth profile descriptors.

4. The wireless station of claim 1, wherein the request message comprises at least one of:
a local channel identification;
a maximum transmission unit (MTU) for a link control adaptation protocol (L2CAP) channel;
a version of the fast connection protocol;
a transaction identifier; or
a minimum supported version of the fast connection protocol.

5. The wireless station of claim 1, wherein the request message comprises a supported profile mask of all fast connect protocol profiles supported by the wireless station.

6. The wireless station of claim 1, wherein a first list of Bluetooth profile descriptors aggregates configuration parameters for a plurality of Bluetooth profiles supported by the wireless station.

7. The wireless station of claim 1, wherein a Bluetooth profile descriptor comprises at least one of:
link control adaptation protocol (L2CAP) channel information;
radio frequency communication (RFCOMM) channel information if a profile is over RFCOMM;
handsfree service level connection data;
audio/video data transport protocol/advanced audio distribution profile (AVDTP/A2DP) profile information;
audio/video control transport protocol/audio/video remote control profile (AVCTP/AVRCP) profile information; or
advanced accessory control profile (AACP) profile information.

8. The wireless station of claim 1, wherein a Bluetooth profile descriptor is encoded using a type, length, value (TLV) type format.

9. An apparatus, comprising:
a memory; and
at least one processor in communication with the memory, wherein the at least one processor is configured to:
generate instructions to pair with a peer wireless station that supports a fast connection protocol for Bluetooth profiles configuration;
generate instructions to transmit, to the peer wireless station, a first list of Bluetooth profile descriptors for a plurality of supported Bluetooth profiles;
receive, from the peer wireless station, a second list of Bluetooth profile descriptors for a plurality of Bluetooth profiles supported by the peer wireless station; and
determine a configuration of a plurality of Bluetooth profiles based, at least in part, on a comparison of the first list of Bluetooth profile descriptors to the second list of Bluetooth profile descriptors.

10. The apparatus of claim 9, wherein the first list of profile descriptors aggregates configuration parameters for the plurality of Bluetooth profiles supported by the apparatus.

11. The apparatus of claim 9, wherein the at least one processor is further configured to transmit a message comprising one or more parameters that indicate a version of the fast connection protocol and/or a minimum supported version of the fast connection protocol.

12. The apparatus of claim 9, wherein the at least one processor is further configured to transmit a message comprising one or more parameters that indicate a maximum transmission unit (MTU) for a link control adaptation protocol (L2CAP) channel.

13. The apparatus of claim 9, wherein the at least one processor is further configured to transmit a message comprising a mask of all fast connect protocol profiles supported by the apparatus.

14. The apparatus of claim 9, wherein a profile descriptor of the first list or the second list comprises at least one parameter indicating one or more of:
link control adaptation protocol (L2CAP) channel information;
radio frequency communication (RFCOMM) channel information if a profile is over RFCOMM;
handsfree service level connection data;
audio/video data transport protocol/advanced audio distribution profile (AVDTP/A2DP) profile information;
audio/video control transport protocol/audio/video remote control profile (AVCTP/AVRCP) profile information; or
advanced accessory control profile (AACP) profile information.

15. A non-transitory computer readable memory medium storing program instructions executable by processing circuitry to cause a wireless station to:
pair, after exchange of messages confirming support of a fast connection protocol for Bluetooth profiles configuration, with a peer wireless station;
exchange, with the peer wireless station, lists of Bluetooth profile descriptors for a plurality of supported Bluetooth profiles; and
determine a configuration of a plurality of Bluetooth profiles based, at least in part, on a comparison of the exchanged lists of Bluetooth profile descriptors.

16. The non-transitory computer readable memory medium of claim 15, wherein a first list of Bluetooth profile descriptors aggregates configuration parameters for the plurality of Bluetooth profiles supported by the wireless station.

17. The non-transitory computer readable memory medium of claim 15, wherein the program instructions are further executable to generate instructions to transmit a request message comprising a supported profile mask of all Bluetooth profiles supported by the wireless station.

18. The non-transitory computer readable memory medium of claim 15, wherein a Bluetooth profile descriptor of lists comprises at least one of:
a local channel identification;
a maximum transmission unit (MTU) for a link control adaptation protocol (L2CAP) channel;
a version of the fast connection protocol;
a transaction identifier; or
a minimum supported version of the fast connection protocol.

19. The non-transitory computer readable memory medium of claim 15,
 wherein a Bluetooth profile descriptor of the lists is encoded using a type, length, value (TLV) type format.

20. The non-transitory computer readable memory medium of claim 15,
 wherein the configuration of the plurality of Bluetooth profiles comprises Bluetooth profiles matched between the exchanged lists.

\* \* \* \* \*